United States Patent [19]
Görge et al.

[11] Patent Number: 6,015,447
[45] Date of Patent: *Jan. 18, 2000

[54] COBALT METAL AGGLOMERATES, A METHOD OF PRODUCING THEM AND THEIR USE

[75] Inventors: Astrid Görge; Juliane Meese-Marktscheffel, both of Goslar, Germany; Dirk Naumann, Ontario, Canada; Armin Olbrich, Seesen; Frank Schrumpf, Goslar, both of Germany

[73] Assignee: H.C. Starck GmbH & Co. KG, Goslar, Germany

[*] Notice: This patent is subject to a terminal disclaimer.

[21] Appl. No.: 08/952,551

[22] PCT Filed: May 14, 1996

[86] PCT No.: PCT/EP96/02049

§ 371 Date: Nov. 21, 1997

§ 102(e) Date: Nov. 21, 1997

[87] PCT Pub. No.: WO96/37324

PCT Pub. Date: Nov. 28, 1996

[30] Foreign Application Priority Data

May 26, 1995 [DE] Germany .......................... 195 19 331

[51] Int. Cl.⁷ ...................................................... B22F 9/00
[52] U.S. Cl. ................................ 75/255; 75/369; 75/765; 75/374; 75/430; 419/13; 419/14; 419/18; 419/19
[58] Field of Search .............................. 75/343, 336, 369, 75/374, 255; 419/13, 14, 18, 19

[56] References Cited

U.S. PATENT DOCUMENTS

| | | | |
|---|---|---|---|
| 4,093,450 | 6/1978 | Doyle et al. | 75/5 |
| 4,469,505 | 9/1984 | Cheresnowsky et al. | 75/365 |
| 4,588,572 | 5/1986 | Vincler et al. | 423/419 R |
| 4,798,623 | 1/1989 | Cheresnowsky | 75/365 |
| 5,594,929 | 1/1997 | Muhammed et al. | 419/1 |

FOREIGN PATENT DOCUMENTS 4343594 2/1995 Germany.

OTHER PUBLICATIONS

International Preliminary Examination Report Translation received in corresponding International Application PCT/EP 96/02049 filed May 14, 1996.

PCT Search Report received in corresponding International Application PCT/EP 96/02049 filed May 14, 1996 and previously filed with the present application.

*Primary Examiner*—Ngoclan Mai
*Attorney, Agent, or Firm*—Perkins, Smith & Cohen, LLP; Jerry Cohen

[57] ABSTRACT

The present invention relates to cobalt metal agglomerates consisting of peanut-shaped primary particles, to a process for the production thereof and to the use thereof.

10 Claims, 3 Drawing Sheets

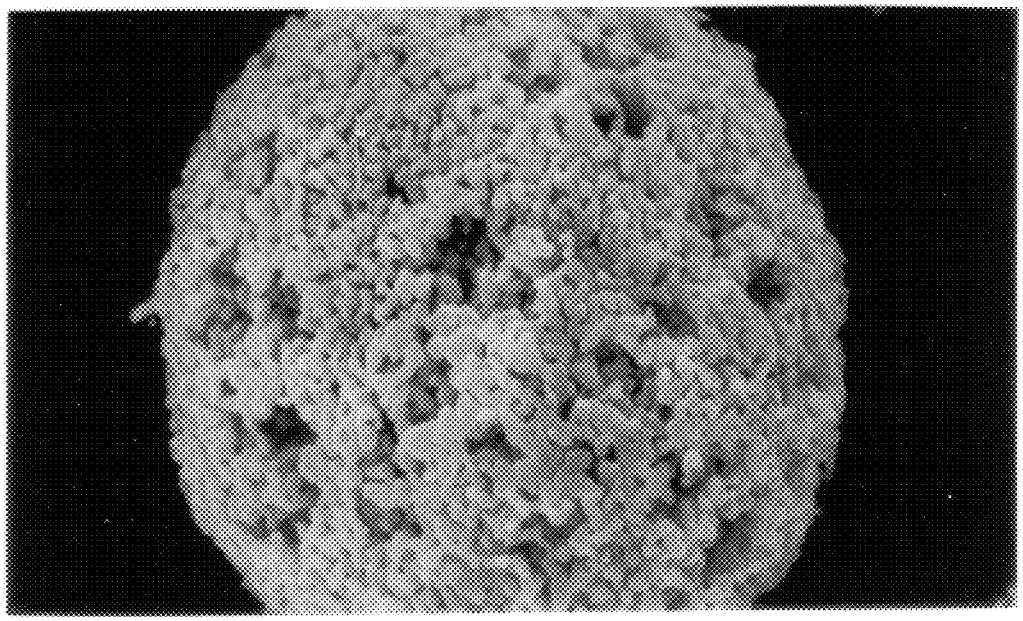
25KV X5,000 1μm        FIG. 3A
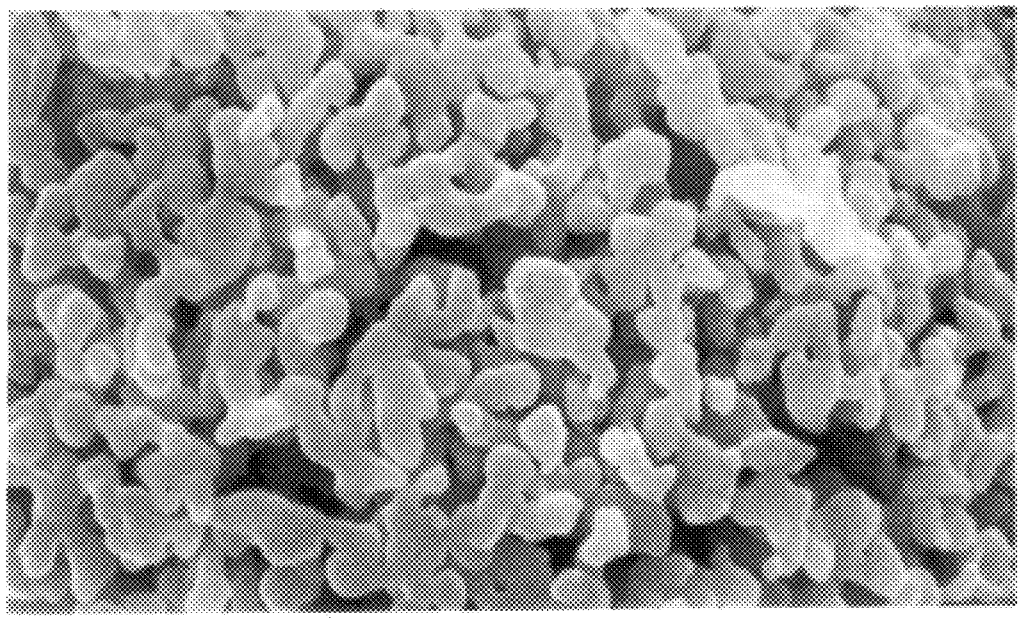
25KV X15,000 1μm        FIG. 3B

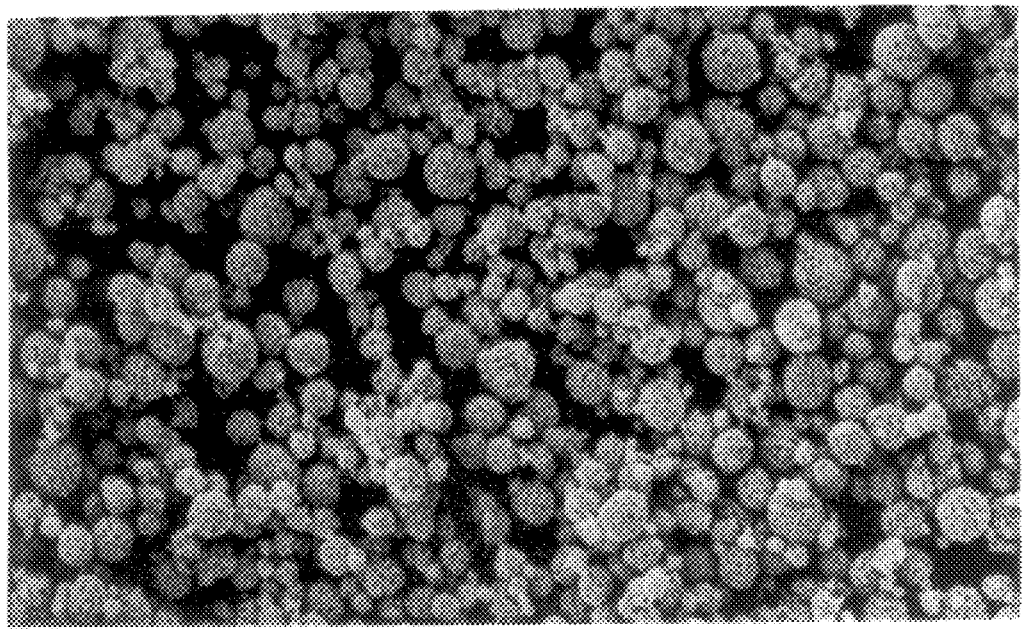
20KV  X500  10μm     FIG. 4A
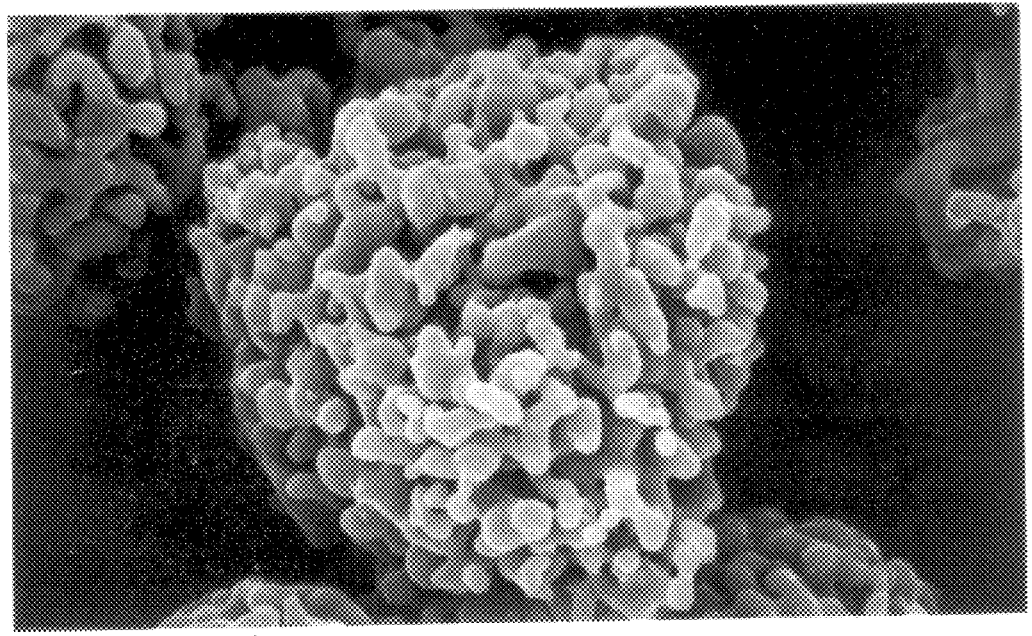
20KV  X5,000  1μm     FIG. 4B

COBALT METAL AGGLOMERATES, A METHOD OF PRODUCING THEM AND THEIR USE

FIELD AND BACKGROUND OF THE INVENTION

The present invention relates to cobalt metal agglomerates consisting of peanut-shaped primary particles, to a process for the production thereof and to the use thereof.

Finely divided cobalt metal is mainly used as a binder in the production of hard metal and cutting tools based on various hard materials, such as for example WC, diamond, SiC and CBN. The cobalt metals used, for example, in the production of diamond tools must fulfil specific requirements. These include, in the first instance, that impurities such as Al, Ca, Mg, S and Si should be avoided as these elements readily form stabile oxides with the residual oxygen of the cobalt metal powder, so causing unwanted porosity in the segments.

It is also necessary, especially when producing segments with synthetic diamonds, to use only cobalt metal powders with very active sintering properties, as minimum densities of 8.5 g/cm$^3$ are required in this case. These densities should be achieved at a sintering temperature range of as low as <900° C. because the diamond may be converted into graphite at higher temperatures. If the sintering activity of the cobalt metal is inadequate, sufficient hardness is not achieved. Under the extreme stresses to which annular drilling bits or cutting tools are exposed, the abrasive action of stone dust leads to deep erosion and unwanted detachment of the diamonds or other hard materials and consequently a loss of cutting performance.

According to the prior art, cobalt metals are used, on the one hand, in the form of mixtures of atomised cobalt metal powders with hydrogen-reduced powders, as are disclosed in DE-A 4 343 594, on the other hand as ultra-fine and extra-fine grade cobalt metal powders.

Ultra-fine powders are differentiated by their FSSS value of <1.0 µm from extra-fine powders which have FSSS values of between 1.2 and 1.4 µm.

The small particle size and the resultant large surface areas of the described cobalt metal powders promote the absorption of atmospheric oxygen and moisture, which frequently leads to degradation of the flowability of the powders.

The object of the present invention was thus to provide a sintering active cobalt metal which does not exhibit the stated disadvantages, but does allow the production of segments with elevated density and hardness.

It has now proved possible to provide a cobalt metal powder which exhibits these required properties.

SUMMARY OF THE INVENTION

These are cobalt metal agglomerates consisting of peanut-shaped primary particles, characterised in that the primary particles have average particle sizes in the range from 0.1 to 0.7 µm. These cobalt agglomerates are the subject matter of this invention. They preferably have a spherical secondary structure with average agglomerate diameters of 3 to 50 µm, preferably of 5 to 20 µm. By virtue of their spherical secondary structure they are distinguished by good flow properties.

BRIEF DESCRIPTION OF THE DRAWING

FIGS. 3, 4 (upper and lower parts of each) are scanning electron micrographs for articles produced per the present invention as described below.

DETAILED DESCRIPTION OF THE INVENTION

The irregularly elongated primary particles preferably have an average particle length of 0.5 to 1 µm and, generally, a diameter of <0.5 µm.

FIG. 3 shows 5000 and 15000 times magnification scanning electron micrographs of the cobalt metal powder agglomerates of the invention produced according to example 3.

The specific surface areas of the cobalt metal agglomerates according to the invention (determined using the nitrogen single point method to DIN 66 131) are preferably 2 to 6 m$^2$/g. These surface areas and the small particle sizes of the primary particles are responsible for the elevated sintering activity of the cobalt metal agglomerates according to the invention, from which sintered articles having densities of 8.5 g/cm$^3$ may be produced at temperatures of as low at 700° C.

Figure 2:
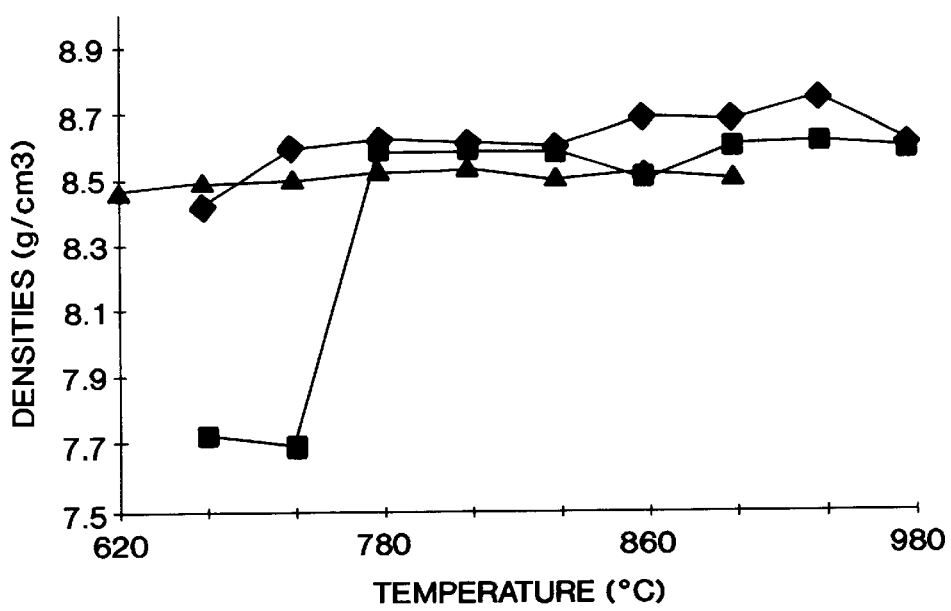

FIG. 2 and table 2 show the densities of a sintered article produced from the cobalt metal powder agglomerate of the invention produced according to example 3 in comparison with sintered articles produced from commercially available ultra- and extra-fine cobalt metal powders as a function of sintering temperatures.

Figure 1:
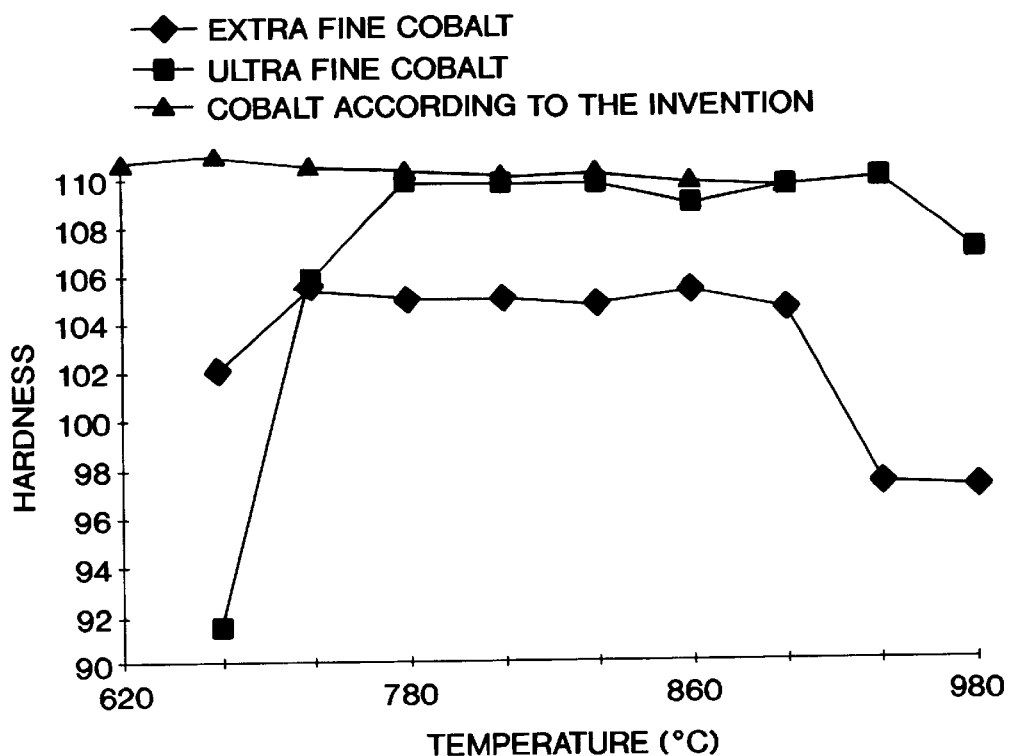
FIGS. 1, 2 show y-axis hardness and density values, respectively, vs. x-axis (sinter) temperatures of cobalt articles of the known extrafine and ultra-fine types and made according to the present invention.

Hardness values of 110 HR$_B$ may be achieved with segments hot pressed at temperatures of only up to 620° C. These hardness values are among the highest hitherto achieved. With prior art cobalt metal powders, sintering temperatures of approximately 780° C. are required for HR$_B$ values of 110. FIG. 1 and table 1 show the hardness values of a sintered article produced from the cobalt metal powder agglomerate of the invention in comparison with sintered articles produced from commercially available ultra- and extra-fine cobalt metal powders as a function of sintering temperatures. It may clearly be seen that elevated hardness values are obtained with the cobalt metal powder according to the invention at temperatures of as low as 620° C., the hardness values moreover remaining constant over the entire temperature range up to 900° C. This affords the manufacturer of sintered composite hard material and drilling tools great production latitude without any need to fear any quality fluctuations caused by differing hardness values of the cobalt binder.

The present invention also provides a process for the production of the cobalt metal agglomerates according to the invention.

The process is characterised in that in a first stage an aqueous cobalt(II) salt solution of the general formula CoX$_2$, wherein X$^-$=Cl$^-$, NO$_3^-$ and/or ½ SO$_4^{2-}$ is reacted, preferably in a continuously operated tubular flow reactor with vigorous stirring, with an aqueous solution of alkali metal and/or ammonium carbonates and/or hydrogen carbonates. The temperature range for the reaction is here preferably between 60 and 90° C. In this process, in contrast with the conventional precipitation process, a rod-shaped crystallised cobalt carbonate is not formed, but instead a spherical basic cobalt carbonate. This is filtered and washed until free of neutral salt. The resultant basic cobalt carbonate is converted in a further processing stage into spherical cobalt(II) hydroxide by adding alkali liquors, so achieving the secondary morphology, and is then oxidised with suitable oxidising agents to yield cobalt(III) oxidehydroxide, heterogenite, CoO(OH). Suitable oxidising agents are, inter alia, hypochlorites, peroxydisulphates, peroxides. It has surprisingly now been found that oxidation of the cobalt(II) hydroxide to yield heterogenite is accompanied by a reduction in primary particle size, while completely achieving the secondary morphology. This fine particle size of 0.3 to 1.0 $\mu$m is retained when the heterogenite is subsequently reduced to cobalt metal over a wide range of temperatures from 300 to 800° C. Gaseous reducing agents, such as hydrogen, methane, dinitrogen oxide and/or carbon monoxide, are preferably used at furnace temperatures of 350 to 650° C.

Unlike conventional known extra-fine and ultra-fine cobalt powders, the cobalt metal agglomerates according to the invention have very good flow properties by virtue of their spherical secondary structure.

By virtue of the described properties, the cobalt metal powders according to the invention are particularly suitable as binders in the production of hard metal and/or diamond tools. It should be noted that the cobalt metal powder agglomerates may here advantageously be used both alone and combined with other binder metals.

The present invention accordingly provides the use of the cobalt metal agglomerates according to the invention for the production of sintered cobalt articles and for the production of composite sintered articles based on cobalt metal and hard materials from the group comprising diamond, CBN, WC, SiC and $Al_2O_3$.

By virtue of the good flow properties and the fine primary structure of the cobalt metal powder agglomerates according to the invention, they are also particularly suitable for incorporation into the positive electrode composition containing nickel hydroxide in rechargeable batteries based on nickel/cadmium or nickel/metal hydride technologies.

During the so-called forming cycles, the cobalt metal is initially oxidised in accordance with its potential to cobalt (II). In the alkaline electrolyte (30% KOH solution), this forms soluble cobaltates(II) and is thus uniformly distributed within the electrode composition. On further charging, it is ultimately deposited as an electrically conductive CoO(OH) layer on the nickel hydroxide particles, so allowing the desired full utilisation to be made of the nickel hydroxide in the storage battery. The described anodic dissolution of the cobalt metal powder naturally proceeds all the faster and more effectively, the finer is the primary structure or the greater is the surface area of the metal powder.

The present invention thus also provides the use of the cobalt metal agglomerates according to the invention as a component in the production of positive electrodes in alkaline secondary batteries based on nickel/cadmium or nickel/metal hydride technologies.

The invention is illustrated in the following examples below, without this constituting any limitation.

EXAMPLES

EXAMPLE 1

20 l of water were introduced into a stirred flow reactor and heated to 80° C. 5 l/h of a 1.7 molar $CoCl_2$ solution and 19 l/h of a 0.9 molar $NaHCO_3$ solution were continuously metered into the reactor with vigorous stirring. Once the steady state had been reached, the resultant product was discharged from the reactor overflow, filtered and washed with water until free of neutral salt. The product was then dried to constant weight at T=80° C.

Chemical analysis of the basic cobalt carbonate obtained in this manner revealed a Co content of 54.3% and carbonate content was determined at 32.3%.

EXAMPLE 2

500 g of basic cobalt carbonate, produced according to example 1, were suspended in 2 l of water. This suspension was combined with 200 g of NaOH dissolved in 1.5 l of water, heated to 60° C. and stirred for 1 hour. The product was filtered and washed with 3 l of hot water. While still moist, the filter cake was resuspended in 2 l of water and oxidised within 1.5 hours with 700 ml of $H_2O_2$ (30%) at a temperature of 45° C. On completion of addition, stirring was continued for a further 0.5 hour, the product was then filtered, rewashed with 2 l of hot water and dried to constant weight at 80° C. 420 g of spherically agglomerated heterogenite with an agglomerate $D_{50}$ value of 10.5 $\mu$m were obtained. Cobalt content was analysed at 63.9%.

EXAMPLE 3

200 g of spherically agglomerated heterogenite produced according to example 2, were weighed into a quartz boat and reduced in a stream of hydrogen for 3 hours at T=450° C. 131 g of spherically agglomerated cobalt metal were obtained. FIG. 3 shows 5000 and 15000 times magnification scanning electron micrographs of this agglomerate. The $D_{50}$ value of the cobalt metal powder was 10.5 $\mu$m. The FSSS value was 0.62 $\mu$m.

EXAMPLE 4

Sintering test

The cobalt metal agglomerates obtained according to example 3 were subjected to hot pressing tests under the following conditions:

| Apparatus used: | DSP 25-ATV |
| --- | --- |
| | (from Dr. Fritsch GmbH) |
| Heating time to final temperature: | 3 min |
| Holding time: | 3 min |
| Final pressure: | 350 N/mm$^2$ |
| Final temperature: | see tables 1 and 2 |
| Dimensions: | 40 × 4 × 10 mm |

Table 1 and FIG. 1 show the hardness values of a sintered article produced from the cobalt metal powder agglomerate of the invention from example 3 in comparison with sintered articles produced from commercially available ultra- and extra-fine cobalt metal powders as a function of sintering temperatures. It may clearly be seen that elevated hardness values are obtained with the cobalt metal powder according to the invention at temperatures of as low as 620° C., the hardness values moreover remaining constant over the entire temperature range up to 980° C.

TABLE 1

(Hardness values)
Rockwell hardness values ($HR_B$)

|  | 620° C. | 700° C. | 780° C. | 900° C. | 980° C. |
| --- | --- | --- | --- | --- | --- |
| Co uF[1] |  | 91.5 | 109.8 | 109.7 | 107 |
| Co eF[2] |  | 102.5 | 105.0 | 104.6 | 97.2 |

TABLE 1-continued (Hardness values)
Rockwell hardness values (HR$_B$)

|  | 620° C. | 700° C. | 780° C. | 900° C. | 980° C. |
|---|---|---|---|---|---|
| Cobalt metal powder agglomerate from example 3 | 110.6 | 110.9 | 110.1 | 110.5 | |

[1] Ultra-fine cobalt metal powder supplied by Eurotungstene Grenoble, France
[2] Extra-fine cobalt metal powder supplied by Hoboken Overpelt, Belgium Table 2 and FIG. 2 show the densities of a sintered article produced from the cobalt metal powder agglomerate of the invention from example 3 in comparison with sintered articles produced from commercially available ultra- and extra-fine cobalt metal powders as a function of sintering temperatures.

TABLE 2

(Densities)
Densities [g/cm³]

|  | 620° C. | 700° C. | 800° C. | 900° C. | 980° C. |
|---|---|---|---|---|---|
| Co uF[1] | | 7.72 | 8.58 | 8.60 | 8.59 |
| Co eF[2] | | 8.42 | 8.62 | 8.67 | 8.61 |
| Cobalt metal powder agglomerate from example 3 | 8.47 | 8.49 | 8.53 | 8.50 | |

Table 3 compares the particle sizes and BET specific surface areas of the cobalt metal agglomerates (determined using the nitrogen single point method to DIN 66 131) from example 3 with those of commercially available ultra- and extra-fine cobalt powders.

TABLE 3

(Particle size and specific surface areas)

|  | FSSS [µm] | BET [m²/g] |
|---|---|---|
| Co uF[1] | < 1 | 1.4 |
| Co eF[2] | 1.2—1.4 | 0.8—1.0 |
| Cobalt metal agglomerate from example 3 | < 0.7 | 2.8—4.0 |

Patent claims:

1. Cobalt metal agglomerates consisting of peanut-shaped primary particles, wherein the primary particles have average particle sizes in the range from 0.1 to 0.7 µm.

2. Cobalt metal agglomerates according to claim 1, wherein they have a spherical secondary structure with average agglomerate diameters of 3 to 50 µm.

3. Cobalt metal agglomerates according to either of claims 1 or 2, wherein agglomerate diameters are 5 to 20 µm.

4. Cobalt metal agglomerates according to either of claims 1 or 2, wherein they have a specific surface area in the range from 2 to 6 m²/g.

5. Process for producing cobalt metal agglomerates according to any of claims 1–4 comprising the steps of:

(a) continuously reacting one or more cobalt salt of the general formula CoX$_2$, wherein X is selected from the group consisting of Cl-, NO$_3$- and ½ SO$_4^{2-}$, with aqueous forms of one or more carbonates selected from the group consisting of alkali metal carbonates, ammonium carbonates and hydrogen carbonates, at temperatures of between 40 and 100° C. to form basic cobalt carbonate, (b) separating and washing the basic cobalt carbonate until free of neutral salt, (c) then reacting the basic cobalt carbonate with alkali or ammonium liquor, (d) oxidizing it with an oxidizing agent to yield trivalent heterogeneous CoO (OH)$_2$, and (e) reducing the heterogenite with reducing agents to yield cobalt metal agglomerates.

6. Process according to claim 5, wherein H$_2$O$_2$ is the oxidising agent.

7. Process according to either of claims 5 or 6, wherein the reaction with gaseous reducing agents is performed at temperatures of between 300 and 800° C.

8. Process making a cobalt article comprising sintering the metal agglomerates of claim 1.

9. Process of claim 8 wherein the agglomerates are co-sintered with additional material selected from the group consisting of diamond, cubic-boron-nitride (CBN), tungsten carbide, silicon carbide and aluminum oxide.

10. Process for making a positive electrode of an alkaline secondary battery selected from the class consisting of nickel/cadmium and nickel/metal hydride comprising sintering together the agglomerates of claim 1.

* * * * *